United States Patent

Moss et al.

Patent Number: 5,052,765
Date of Patent: Oct. 1, 1991

[54] SCANNING FIBER OPTIC HOLOGRAPHIC EXPOSURE AND FEEDBACK SYSTEM

[75] Inventors: Gaylord Moss, Marina del Rey; John E. Wreede, Monrovia, both of Calif.

[73] Assignee: Hughes Aircraft Company, Los Angeles, Calif.

[21] Appl. No.: 542,861

[22] Filed: Jun. 25, 1990

Related U.S. Application Data

[63] Continuation-in-part of Ser. No. 401,394, Aug. 31, 1989, Pat. No. 4,960,311.

[51] Int. Cl.⁵ .................................. G03H 1/08
[52] U.S. Cl. .................................. 359/9; 359/10; 359/28; 359/34
[58] Field of Search .................. 350/3.6, 3.66, 3.67, 350/3.69, 3.81, 3.83

[56] References Cited

U.S. PATENT DOCUMENTS

| | | | |
|---|---|---|---|
| 4,111,519 | 9/1978 | Gillis et al. | 350/3.66 |
| 4,155,630 | 5/1979 | Ih | 350/3.67 |
| 4,376,950 | 3/1983 | Brown et al. | 350/3.6 |
| 4,456,328 | 6/1984 | Arnes et al. | 350/3.6 |
| 4,458,977 | 7/1984 | Arnes et al. | 350/3.6 |
| 4,458,978 | 7/1984 | Arnes et al. | 350/3.67 |
| 4,560,235 | 12/1985 | Servaes et al. | 350/96.24 |
| 4,799,765 | 1/1989 | Ferres | 350/162.23 |
| 4,960,311 | 10/1990 | Moss et al. | 350/3.66 |

Primary Examiner—Bruce Y. Arnold
Assistant Examiner—J. P. Ryan
Attorney, Agent, or Firm—Leonard A. Alkov; Wanda K. Denson-Low

[57] ABSTRACT

A fiber optic point source is utilized to generate a first wavefront which is intersected with a second wavefront to form a desired interference pattern in a recording medium. The point source is moved relative to the recording medium during exposure in order to reduce multiple order scattering noise, and a feedback monitoring system permits determination of portions of the recording medium requiring increased exposure.

13 Claims, 1 Drawing Sheet

Fig. 1

SCANNING FIBER OPTIC HOLOGRAPHIC EXPOSURE AND FEEDBACK SYSTEM

RELATED APPLICATIONS

This application is a continuation-in-part of Ser. No. 401,394, filed Aug. 31, 1989 now U.S. Pat. No. 4,960,311.

BACKGROUND OF THE INVENTION

1. Field of the Invention

This invention relates to a system and method for exposing holograms, and more particularly, relates to a system and method for forming master holograms from a reflective element substantially reducing undesirable spurious hologram noise recordings, and a feedback system for sensing the efficiency of the hologram being formed.

2. Description of Related Art

High quality holographic optical elements are used in diffraction optics display systems, such as a Head Up Display (HUD) for advanced aircraft, helmet mounted displays, laser eye protection devices, narrow band reflective filters, and holographic high gain screens for simulators. These are only a few of the many uses of high quality holograms. Problems can arise in providing economical mass production of reflective holographic optical elements where the production units are "copies" of either a master reference object or a master hologram, which may, for example, provide an aspheric reflective wavefront.

Diffraction optic display systems utilizing a hologram can experience a degradation of the holographic images as a result of the effects of spurious reflection and transmission hologram recordings that are frequently generated during the holographic replication process. The spurious noise holograms have been found to be generated by reflections from surfaces which are interfaces of materials of different refractive index, such as air/glass or imperfectly index matched interfaces of the surfaces of the recording cover plate, the holographic substrate and the recording medium. These reflections can combine with the primary holographic beams at the recording medium to form both spurious reflection hologram recordings and spurious transmission hologram recordings. As a result, a subsequent display system will create ghost images from the spurious reflection hologram recordings and rainbow-like flare patterns from the spurious transmission hologram recordings.

The prior art has attempted to address these problems in numerous different ways. One approach has been to minimize the difference in indexes of refraction by attempting to match the indexes of refraction with an index matching fluid, such as mineral oil. Attempts have been made to immerse a recording module in an index of refraction matching oil bath. Another approach has been to form a hologram with energy beams impinging the recording film supporting elements at the Brewster's angle (the angle for which light of a given polarization has very low reflection).

U.S. Pat. Nos. 4,458,977, 4,458,978, and 4,456,328 disclose prior art approaches to eliminate the noise caused by a glass/air interface of an outer surface cover plate by moving the cover plate to change the phase of the reflected rays relative to the primary beams during the recording period so that spurious holograms are not formed. The rate of movement or phase change in accordance with these solutions is a function of the exposure time which itself is a function of the sensitivity of the recording medium. The total amplitude of the movement is made sufficient to produce a phase change of one or more half wavelengths in the reflected noise beams to nullify the aforementioned spurious recorded interference patterns. These approaches have been proposed to solve the complex problems involved in the manufacturing of reflective holographic optical elements for use in heads up displays.

Generally, prior art solutions employ a layer of index matching fluid, such as an appropriate mineral oil, which will vary in thickness during the cover movement. The required relatively thick image layer of index matching fluid has the capacity to degrade the image of the reference object, such as an aspheric mirror, create moving striations causing fringe degradation and furthermore requires frequent time consuming cleaning of the oil. In a double beam system recording system the oil instability requires days of stabilization before a successful holographic exposure can be made. Even a master aspheric mirror single beam exposure system requires many hours of stabilization and the use of relatively skilled labor.

Additionally, in the prior art approaches, generally only the outer surface, that is, the glass/air interface elements, could be provided with an antireflective coating. If an inner surface was required to be coated for optimum later system use in air, the antireflective coating had to be added at a later time after the exposure. This caused many problems: adding an antireflective coated glass added further weight and expense, depositing a standard anti-reflective coating frequently thermally destroyed the hologram, and depositing a cold anti-reflective coating made a coating which was less efficient and more fragile. Finally, these "moving cover plate" examples of the prior art required a piezoelectrically controlled exposure cover that had to be appropriately mounted and calibrated prior to exposure, which increased the expense and lowered the manufacturing yield.

U.S. Pat. No. 4,478,490 discloses an alternative method of reducing coherent noise content through the modulation of the position of an apodizer in the optical path during an exposure. The motion of the apodizer creates a condition permitting the amplitude of the wavefront to be modified to alter a point source response, that is, to change the point spread function, whereby the fringe patterns created by the apodizer are unstable and hence reduce the noise content of the transmitted radiation.

Another prior art attempt to remove noise has been the use of a laser source without an etalon to reduce noise holograms from a surface further away than the laser coherence length (approximately two inches for a large argon laser). While this method can reduce noise, it is applicable only in cases in which the exposure apparatus surfaces are closely spaced, such as approximately one-quarter-inch, as in a HUD type hologram with an aspheric mirror surface.

The prior art has frequently recognized the desirability of reproducing copies from a master hologram. A theory of such copying of holograms is set forth in Brumm, "Copying Holograms," Applied Optics, Volume 5, No. 12, page 1946, December 1966. Reference is also made to U.S. Pat. Nos. 3,758,186, 3,639,031, 3,647,289, 4,312,559, and 4,530,564 to disclose other methods of copying holograms.

In modern aircraft, there is frequently minimal space in the cockpit. This limitation requires that any optical system be folded and compressed for a head up display. As a result, complex aspheric reflecting mirrors are needed. Holographic aspheric mirrors represent a lightweight and efficient solution to this requirement. As mentioned above, conventional glass or metal aspheric mirrors have been fabricated for use as a master reference in producing HUD holograms. This approach involves a lengthy and expensive procedure of grinding an aspheric mirror to the subjective requirements of a particular head up display. Furthermore, the nonspherical surface of such a master mirror limits how close the aspheric reference member can be placed relative to the recording material for replicating the aspheric diffraction grating in the recording medium.

Another method to generate the master mirror that is known in the prior a.. .. to p... .de computer generated holograms. In this method, the design of the desired wavefront is mathematically described and a computer then forms a two-dimensional amplitude hologram representative of that wavefront. The computer can drive a printer to produce the desired diffraction grating on a substrate or alternatively create the grating by electronic or chemical procedures. A problem in using a computer generated hologram as an initial imaging source for the fabrication of a holographic HUD combiner is the noise in the computer generated master hologram. This noise is present in the form of a general nonuniformity of brightness and in multiple order scattering. The computer generated hologram has multiple order noise because the fringe pattern is generally formed as abrupt discrete units rather than sinusoidally varying as in an ideal holographic recording of a laser interference pattern.

It would be desirable to provide an optimum method and apparatus for the reproduction of multiple hologram optical elements in an economical and efficient manner, for HUD manufacturing and reducing the creation of noise in the HUD hologram.

It would also be desirable for such a method and apparatus to include scanning exposure with a single mode polarization preserving fiber optic to provide the primary beam, with a lateral motion of the fiber optic to reduce noise, with a relatively small distance between the photosensitive material forming the reflective holographic optical element and the reflective element which provides the second beam, and a feedback system which senses the efficiency of the hologram being formed.

SUMMARY OF THE INVENTION

A method and apparatus for exposing a recording medium with a moving fiber optic point source to reduce multiple order scattering noise is provided. In one embodiment a scanning fiber optic coherent light point source provides one wavefront necessary to form a master reflective hologram to be replicated in the production of complex optical elements, such as for use as a HUD combiner. A second wavefront, for example, reflected off of a reference mirror surface will interact within the recording medium to provide a desired hologram that can be used for multiple replications in producing aspheric reflecting surfaces for a HUD combiner. A fiber optic point source of coherent illumination is provided for illuminating the recording medium, and the fiber optic coherent light point source is moved in a predetermined manner during the exposure to reduce the multiple order scattering noise. By providing a slight translational dithering movement, the desired recording ray is only changed slightly. However, the noise scattering rays which are the result of individual scattering rays which are the result of individual scattering elements rather than the diffraction effect of the complete assemblage of the fringe pattern are displaced by a substantial distance. As a result of moving the fiber optic point source during the recording, the scatter holograms are reduced by being smeared out with minimal effect on the main hologram.

The effect of the lateral displacement of the fiber optic is to reduce noise in the holograms produced by reflections from glass or air interfaces in the system. The advantage of using a fiber optic and tilting the fiber optic to scan the entire format is that the beam need not be expanded to fill the entire format, so that the size of th.. holog.a... being produced can be large. The short distance between the photosensitive film and the mirror avoids reduction in efficiency of the primary hologram when the fiber optic is displaced laterally. The feedback system permits the production of a uniform exposure or a desired non-uniform exposure, to provide the additional degree of freedom of variable diffraction efficiency over the surface of the reflective holographic optical element.

In those circumstances where the illumination point position change does not shift fringe spacing equally, it is also possible to vary the laser wavelength continuously around the exposure area to effectively smear out any spurious noise holograms.

A feature of the present invention is the utilization of a fiber optic point source during the exposure of the reflective hologram with a relative movement between the fiber optic point source and the recording medium. The movement of the point source is such that any relative phase change in the desired primary recording rays is relatively small since the relative path changes are also small. However, any noise creating a spurious hologram will experience a path change over a much greater distance and therefore there will be relatively greater shifts in the fringes for a noise hologram. If these phase shifts reach half a wavelength, the noise hologram will be essentially wiped out. However, for typical exposure systems, the amount of shift in the primary hologram will only be approximately one-twentieth of the design wavelength, which will not measurably reduce the efficiency of the primary hologram.

BRIEF DESCRIPTION OF THE DRAWINGS

The novel features that are considered characteristic of this invention are set forth with particularity in the appended claims. The invention itself, both as to its organization and method of operation as well as additional objects and advantages thereof, will best be understood from the following description when read in connection with the accompanying drawings, and in which:

DESCRIPTION OF THE PREFERRED EMBODIMENTS

Figure 1:
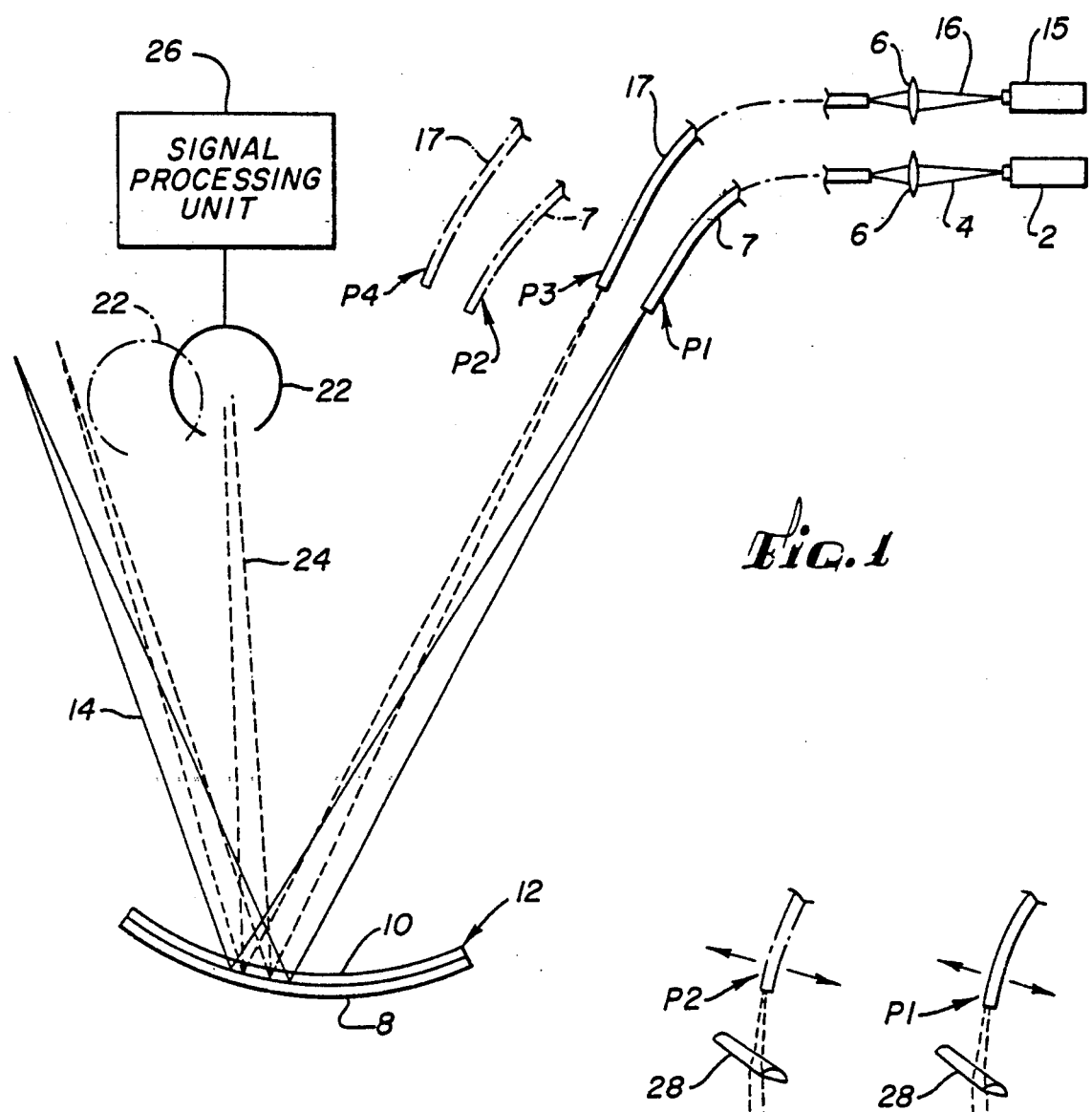
FIG. 1 is a schematic view of an exposure system for developing a HUD aspheric reflective hologram.

The following description is provided to enable any person skilled in the art to make and use the invention, and sets forth the best modes contemplated by the inventors for carrying out their invention. Various modifications, however, will remain readily apparent to those skilled in the art, since the generic principles of the present invention have been defined herein specifically to provide a relatively economical method and apparatus for producing a reflective holographic optical element by moving a fiber optic point source.

The present invention recognizes the advantages of using a scanning fiber optic point source in the manufacturing of complex optical elements, such as aspheric reflectors used in head-up displays. Such a fiber optic point source can be moved for an angular scan, and with small relative translational motion to provide a desired wavefront to provide the effect of an aspheric mirror configuration necessary to meet the constraints and optical performance required in the cockpit of an advanced aircraft. The present invention permits the manufacture of improved products for headup displays, laser eye or device protection elements visor displays, holograms for simulator domes, and large holographic optical elements such as are needed for making an entire windshield of a car or an airplane into a holographic optical element, and even thousands of square meters of hologram needed for the manufacture of solar concentrator devices. Single mode fiber optics which preserve polarization are commercially available for use in the manufacture of holograms. Such fiber optics can be moved and bent slightly without significantly changing the output of the fiber optic in either phase front or polarization, so that such fiber optics are advantageous in a scanning type system. The output beam of such fiber optics is coherent, with an angular beam spread of only a few degrees. A large format can be scanned by changing the direction in which the fiber optic is aimed, and the position of the fiber optic can be moved so as to prevent the noise hologram formed by reflection from distant objects or glass to air interfaces. For a typical head up display type of exposure system, the rate of angular scanning of the point source across the recording medium would be approximately 32 mm per second and the rate of lateral translational motion relative to the recording medium would be approximately 1.6 mm per second. The point source could be conventionally raster scanned, or another of many possible methods of scanning is to expand the beam from the fiber optic with a cylindrical lens to generate an exposure with a thin line, which can be scanned by rotation of the cylindrical lens about its longitudinal axis. Translational motion and angular scanning may be combined without unduly lengthening the exposure time.

The amplitude of the motion for both the dithering and the base position is related to: the distance of the photosensitive film to the mirror; the distance of the source from the mirror; the average angle of the exposure (angle the central ray hits the mirror); the curvature of the mirror; the wavelength of the exposure laser; the amount of efficiency loss acceptable in the final hologram; and the distance between the outer glass surface (the one whose reflections we are trying to negate) and the mirror. In most cases the dither rate will be higher than the change in &he relative base position (it could not be lower).

In one illustrative example, a 1 watt laser may be scanned in an unexpanded 4 mm diameter beam. Assuming a 30° off axis beam, an apparent point source 20 inches from the mirror, a film-mirror distance of 0.010 to 0.20 inches, a substrate thickness of ½ inch, a point source translational motion during exposure of 2 mm will result in very little efficiency loss in the primary hologram, but about 1000 to 1 loss in the noise hologram caused by the top of the substrate air reflection.

Assuming dichromated gelatin and an exposure level of about 200 mj/cm$^2$, any particular spot would be exposed for 0.025 sec. (assuming that there is no overlap and that all laser energy is used.) Thus the scan rate of the beam on the substrate would be 4 mm in 0.025 sec. or 160 mm/sec., or 80 mm/sec. rate. In this case, absolute displacement can occur at the same rate (80 mm/sec.).

In a more typical situation, the beam is expanded as it hits the mirror. For a 4 cm diameter spot (12.6 cm$^2$), the exposure time on spot would be 2.5 sec. Scan rate would be 1.6 cm/sec. (16 mm/sec.). A dithering motion of 2 mm in the 2.5 sec. or 0.8 mm sec. can be tolerated.

A further complication occurs if the scans are overlapped (which would be the most general case). A 50% overlap would mean that each point would effectively be double exposed, with the time between exposures being the time of one scan line (in the case of a 30 cm HUD combiner - 9.4 sec). The scan rate could be 32 mm/sec., and the rate of dithering 1.6 mm/sec., but the absolute displacement for the point source should be no more than the 2 mm in the total time of exposure for a single point (9.4 space + 2.5 sec. exposure = 12 sec.) for 0.16 mm/sec.

Another feature of the invention is the feedback monitoring system and method. The efficiency of the hologram formed during the exposure process can be monitored, and related to final brightness of the hologram after chemical processing. The preferred efficiency monitoring system does not add to the exposure of the holographic element, and this is preferably performed by directing a monitoring beam to the holographic element being formed at an incident angle of illumination which is different from the incident angle of illumination of the primary beam, to separate the monitoring beam from the primary exposure illumination. A detector receiving and measuring the intensity of the monitoring illumination diffracted from the holographic element is also preferably moved in coordination with the primary scanning light beam. The monitoring beam is preferably directed at the holographic element being formed via a fiber optic.

The monitoring beam can also be differentiated from the primary beam by causing the monitoring beam to be of a polarization different from that of the primary beam. The detector placed in the path of the diffracted monitoring beam would be protected by a polarizer with a high extinction ratio. The detector may either move with the scanning beam or be attached to an integrating sphere which accepts the entire exit pupil. Of course, the monitoring beam power must be kept low enough to avoid hardening the recording material.

The monitoring beam may also be incoherent light of nearly the same wavelength as the primary beam. Alternatively, the light could also be coherent but of a wavelength outside the color sensitivity of the photosensitive film. Using such a monitoring system, the efficiency of the hologram being formed at a particular location can be measured and the exposure can be continued until the proper exposure is reached. The proper exposure can be obtained either by regulating the power output of the laser source of illumination, or by controlling the total time that the beam scans over a particular unit area.

FIG. 1 is a schematic illustration of an exposure system for producing either a master hologram from which production holograms for HUD combiners can be manufactured or producing the actual combiners. A laser 2 generates a primary, or reference beam 4 which can be directed through conventional optics 6 and through a primary single mode polarization preserving optical fiber 7 to form the reference wavefront for impacting upon a photosensitive film plane 10 in a recording module 12 containing, for example, a dichromated gelatin as a recording material.

The reference beam from the laser 2 is reflected from a reflecting mirror 8 to form the object beam 14 which is shaped by the mirror to form the object wavefront which, together with the reference wavefront, will form the master hologram in the recording medium 10 that can be replicated in the production of actual HUD combiners.

As can be appreciated, FIG. 1 is not drawn to scale, and the movement of the point source from the point P1 to the point P2 shown in FIG. 1 represents a feature of the present invention to reduce the scattering noise by integrating the noise hologram originating in the glass-air interface reflection. Thus, the fiber optic source of the primary beam 4 and the object beam 14 can be moved from the position P1 to position P2 during the exposure of the recording medium.

The actual lateral translational movement relative to the recording medium will depend on the particular hologram being formed but should typically be at a scan rate of about 0.16 mm/sec and with an absolute displacement of 2 mm or less for a point source which is approximately 20 inches away from the recording medium. The net result of this small translational dithering movement of the fiber optic point source during the exposure of the recording module is a cleaner, higher contrast image in the master hologram. The same system could be also used to make the finished hologram either from a master mirror or master hologram reference.

When it is desired to vary the laser wavelength, it is possible to use an interferometer to measure a predetermined portion of the pattern and to accordingly adjust the wavelength to maintain that position in the pattern stable to thereby balance the variation of the wavelength with the fringe spacing and accordingly use the wavelength to compensate for the movement of the point source. Since the desired effect is a relative lateral movement between the point source and the recording medium, it can be seen that the recording medium can also be displaced laterally to achieve the same effect. Additionally, other optical elements can be utilized to produce the desired, controlled, predetermined movement of the point source to achieve the purpose of the present invention.

As is illustrated in FIG. 1, a secondary laser 15 generates a secondary or monitoring beam 16 which can be directed through conventional optics 6 and through a secondary single mode polarization preserving optical fiber 17, to direct the monitoring beam at the recording medium at an incident angle of illumination which is different than that of the primary beam. An integrating sphere detector 22 is also preferably moved to intercept the diffracted monitoring beam 24, in order to determine the total exposure needed at a particular portion of the holographic element being formed. Variable exposure and the final efficiency of the holographic element can thus be programmed into the feedback system, which would typically include a signal processing unit 26 operating to compute the efficiency of the holographic element based upon the intensity of diffracted illumination of the monitoring beam, and to control the positioning of the integrating sphere detector and the fiber optic elements. Thus, as the primary fiber optic moves from position P1 to position P2, the monitoring beam optical fiber would move from the position P3 to P4, and the integrating sphere would be moved to the position shown in phantom.

As can be appreciated by a person of ordinary skill in the holographic field, various objective parameters are involved in recording a hologram. For example, the recording material, such as dichromatic gelatin, is derived from a natural source and can provide different exposure characteristics and developing time periods. Additionally, the particular design wavelength and the availability of a constant light intensity for such a design wavelength for a particular hologram will have to be computed and will affect the specific parameters of any exposure system. For example, a hologram used as an aspheric reflector in a HUD combiner preferably will have a design wavelength to maximize the reflection of light from a cathode ray tube. This wavelength is not readily available in a laser source and computations are made in the development of the exposed hologram to allow for this variance.

Figure 2:
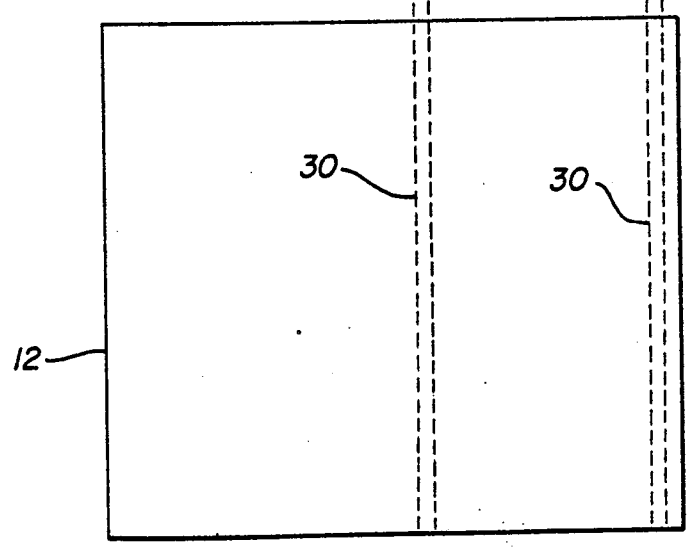
FIG. 2 is a schematic view illustrating scanning with a cylindrical lens beam expander.

It will be appreciated that other methods and apparatus can be used for scanning the primary beam, and for providing a reflective element. Thus, as is illustrated in FIG. 2, a cylindrical lens 28 can be combined with the primary beam scanning fiber optic and rotated about its longitudinal axis to scan across the exposure area in a line extending substantially across the entire exposure area 30 of the holographic element being formed. The fiber optic and cylindrical lens combination may also be translated laterally from a position P1 to a position P2 in addition to the angular scanning motion. It is also possible that the reflective element serving to mirror the primary beam back through the photosensitive material may be a diffraction optical element itself, with a physical shape matching that of the film substrate, and the original source of the diffraction optical element may be a computer generated hologram, a double beam exposure system, or an aspheric mirror.

In essence, there are numerous variables that are subjectively determined when producing holograms and people of ordinary skill in this field are aware that such variables exist and, when determined as to a particular value, can readily provide a prediction of the results of the process of producing a hologram. Accordingly, when evaluating the features of the present invention and determining its scope, the invention solely should be measured from the following claims.

What is claimed is:

1. A system for exposing a recording medium, comprising:
   a fiber optic source of illumination positioned to direct light at the recording medium for exposing the recording medium;
   means for relatively moving the fiber optic source during the exposure; and
   means for interacting with a first beam emitted from the fiber optic source, such means being a reference mirror surface which reflects the first beam to produce an object beam to interact with the first beam within the recording medium to form a desired interference pattern.

2. A system for recording a hologram from a fiber optic source, comprising:
- a reflective mirror for receiving and reflecting rays from said fiber optic source;
- a recording medium positioned between said reflective mirror and said fiber optic source for receiving said rays from said source and said rays reflected from said mirror; and
- means for directing said fiber optic source of illumination at said recording medium and said mirror and for relatively moving said fiber optic source during exposure of the recording medium.

3. A system for exposing a recording medium to form a reflective holographic optical element, comprising:
   a) means for illuminating said recording medium with a primary beam of coherent light, including a primary optical fiber;
   b) means for receiving said coherent light transmitted through said recording medium and for reflecting said coherent light back to said recording medium;
   c) means for moving said optical fiber for simultaneously scanning said recording medium with angular motion and translational motion in at least one dimension to reduce multiple order scattering noise and
   d) means for monitoring efficiency of formation of said reflective holographic optical element.

4. The system of claim 3, wherein said primary beam illuminates said recording medium at a first incident angle of illumination, and said means for monitoring efficiency of formation comprises second means for illuminating said recording medium with a monitoring light beam at a second incident angle of illumination, including a secondary optical fiber, means for moving said secondary optical fiber in coordination with said primary optical fiber, and means for detecting said monitoring light beam diffracted from said recording medium operative to generate a signal indicative of the intensity of light detected.

5. The system of claim 4, further including means for moving said means for detecting in coordination with said second means for illuminating to receive said monitoring beam reflected from said recording medium.

6. The system of claim 3, wherein said means for illuminating said recording medium with a primary beam further comprises a cylindrical lens having a longitudinal axis positioned to receive and transmit said primary beam to said recording medium, and said means for moving said primary optical fiber includes means for rotating said cylindrical lens about said longitudinal axis for scanning said recording medium.

7. The system of claim 3, wherein said means for receiving said coherent light is an aspheric mirror.

8. The system of claim 7, wherein said recording medium forms a layer on a surface of said mirror.

9. The system of claim 8, wherein said primary optical fiber illuminates said recording medium at a first incident angle, and further comprising a secondary optical fiber offset from said primary optical fiber to illuminate said recording medium with light at a second incident angle different from said first incident angle, and a detector positioned to receive light from said secondary optical fiber diffracted from said recording medium and to generate a signal in response to said received light.

10. A method for recording a hologram from a fiber optic point source providing a first wavefront comprising the steps of:
- providing a reflective mirror for receiving light from said fiber optic point source;
- providing a recording medium positioned between said reflective mirror and said fiber optic point source; and
- moving the fiber optic point source relative to said recording medium during exposure of the recording medium.

11. A method for exposing a recording medium positioned adjacent a reflective mirror to form a reflective holographic optical element, comprising the steps of:
   a) illuminating said recording medium with a primary beam of coherent light at an incident angle of illumination from a primary single mode polarization preserving optical fiber providing a first wavefront, with said primary beam reflected from said mirror illuminating said recording medium to form a second wavefront;
   b) scanning said primary optical fiber relative to said recording medium while illuminating said recording medium with an angular scanning motion and a translational motion in at least one dimension;
   c) monitoring efficiency of formation of said reflective holographic optical element; and
   wherein said step of monitoring efficiency of formation comprises illuminating said recording medium with a secondary light beam from a secondary single mode polarization preserving optical fiber at an incident angle of illumination different from the incident angle of illumination of said primary beam and sensing the intensity of said secondary beam diffracted from said recording medium.

12. The method of claim 11, further including the steps of determining which portions of said recording medium require additional exposure from said primary beam, and further illuminating said portions of said recording medium requiring additional exposure.

13. The method of claim 11, wherein said step of monitoring efficiency of formation further includes providing said secondary beam at a wavelength different from the wavelength of the primary beam.

* * * * *